UNITED STATES PATENT OFFICE.

MARK G. RAY, OF RICHMOND, VIRGINIA.

COMPOSITION FOR STOPPING RADIATOR LEAKS.

1,377,275.  Specification of Letters Patent.  Patented May 10, 1921.

No Drawing.  Application filed September 21, 1920.  Serial No. 411,786.

*To all whom it may concern:*

Be it known that I, MARK G. RAY, a citizen of the United States, residing at Richmond, in the county of Henrico and State of Virginia, have invented certain new and useful Improvements in Compositions for Stopping Radiator Leaks, of which the following is a specification.

This invention relates to a novel composition of matter for stopping leaks in automobile radiators.

It has been customary heretofore to stop automobile radiator leaks by introducing into the radiator a quantity of flax seed meal with the idea that the meal, in mixing with the water in the radiator will become soggy and swollen and will eventually find its way to the leak and stop the same. However, the use of flax seed meal alone presents the disadvantage that the meal is liable to lodge in some portion of the radiator, and clog the same so as to interfere with the proper circulation of water through the radiator. Therefore when flax seed meal is employed alone its efficiency as a medium for stopping a radiator leak is liable to be offset by the disadvantage above mentioned.

The present invention therefore has as one of its objects to provide a composition consisting of flax seed meal and other ingredients which will act in a manner to not only increase the efficiency of this agent but at the same time prevent its becoming so lodged in the radiator passages as to clog the same. Likewise the invention has as its object to employ in connection with the flax seed meal other ingredients which will act to clean the interior of the radiator by removing scum or other accumulations or deposits and which will so act upon the flax seed meal as to insure of removal of all surplus meal from the radiator when the latter is drained.

In preparing the composition embodying the invention, I mix together the following ingredients in about the proportions stated:

Powdered aluminum _____ ½ oz.
Powdered graphite _____ ½ oz.
Flax seed meal _____ ½ oz.
Washing soda _____ ¼ oz.
Lye (red seal) _____ 1 oz.

The quantity of the composition obtained by mixing the above ingredients in the proportions and quantities above stated, is ordinarily sufficient for one radiator, and after the ingredients have been thoroughly mixed, the mixture is passed through a ninety mesh screen.

In making use of the composition, the same is introduced into the water standing in the radiator. At the point of location of the leak, the outflow of water through the opening will set up a current in the body of water within the radiator flowing in the direction of the opening, and this current will carry with it particles of the flax seed meal, graphite, and aluminum, and eventually cause the particles of these ingredients to become lodged within the opening and thus fill the same and stop the outflow of water. The heat subsequently developed in the running of the engine will be sufficiently high to materially raise the temperature of the walls of the radiator, and thus when the particles of aluminum, graphite and flax seed meal have become lodged in the leak, they will soon be dried and thus form a permanent plug stopping the leak. While the aluminum and graphite are not chemically affected by the other ingredients of the compound, these ingredients will form in conjunction with the flax seed meal, a very efficient plug for stopping the leak.

Having thus described the invention, what is claimed as new is:

A composition for repairing leaks in radiators and the like comprising a mixture of aluminum, graphite, flax seed meal, washing soda, and lye.

In testimony whereof I affix my signature.

MARK G. RAY. [L. S.]